L. A. BOYCE.
GAGE.
APPLICATION FILED JULY 1, 1910.
1,031,517.
Patented July 2, 1912.
2 SHEETS—SHEET 1.
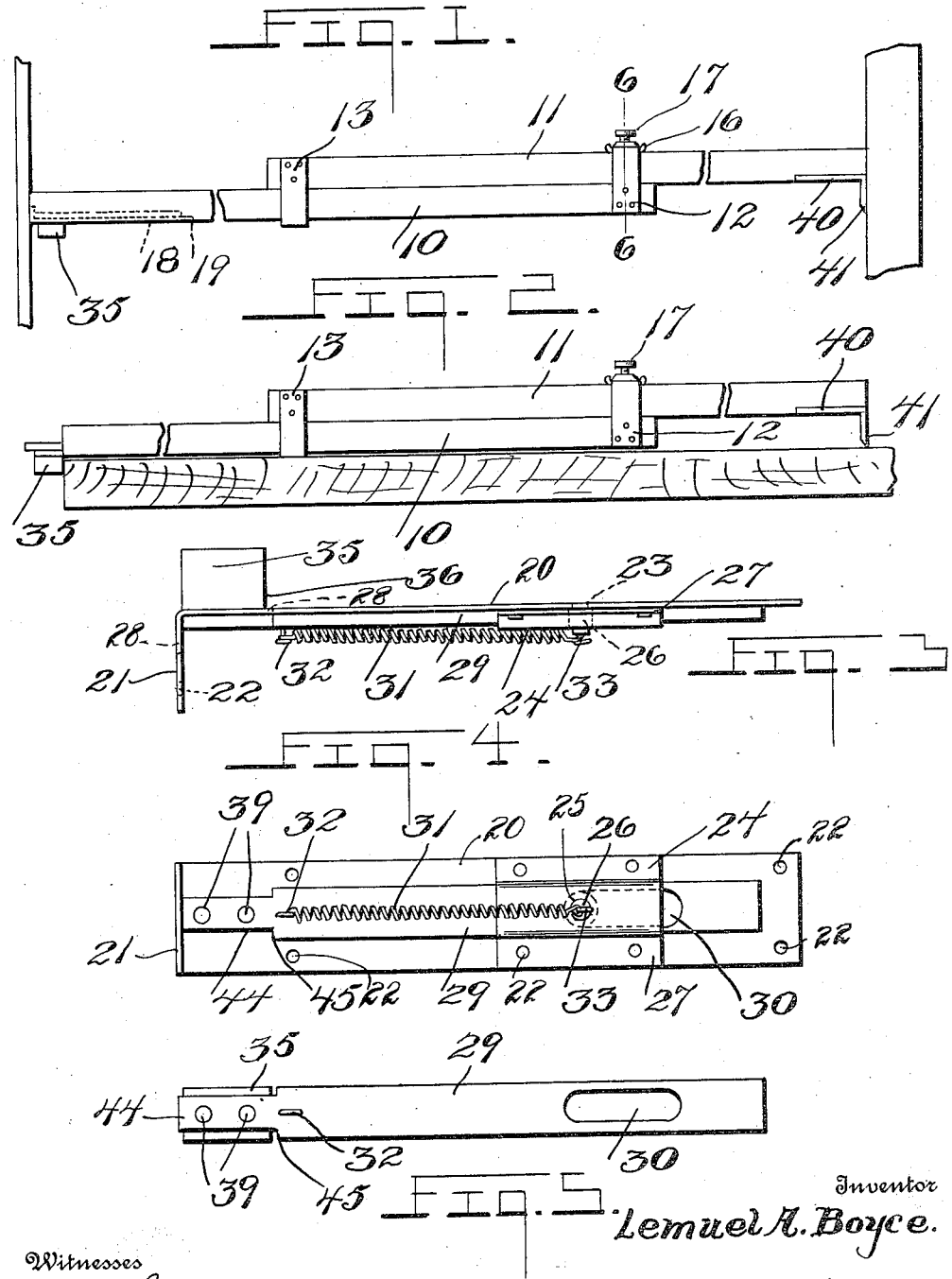
Witnesses
C. E. Johansen.
M. D. Lowry.
Inventor
Lemuel A. Boyce.
By Woodward & Chandlee.
Attorney

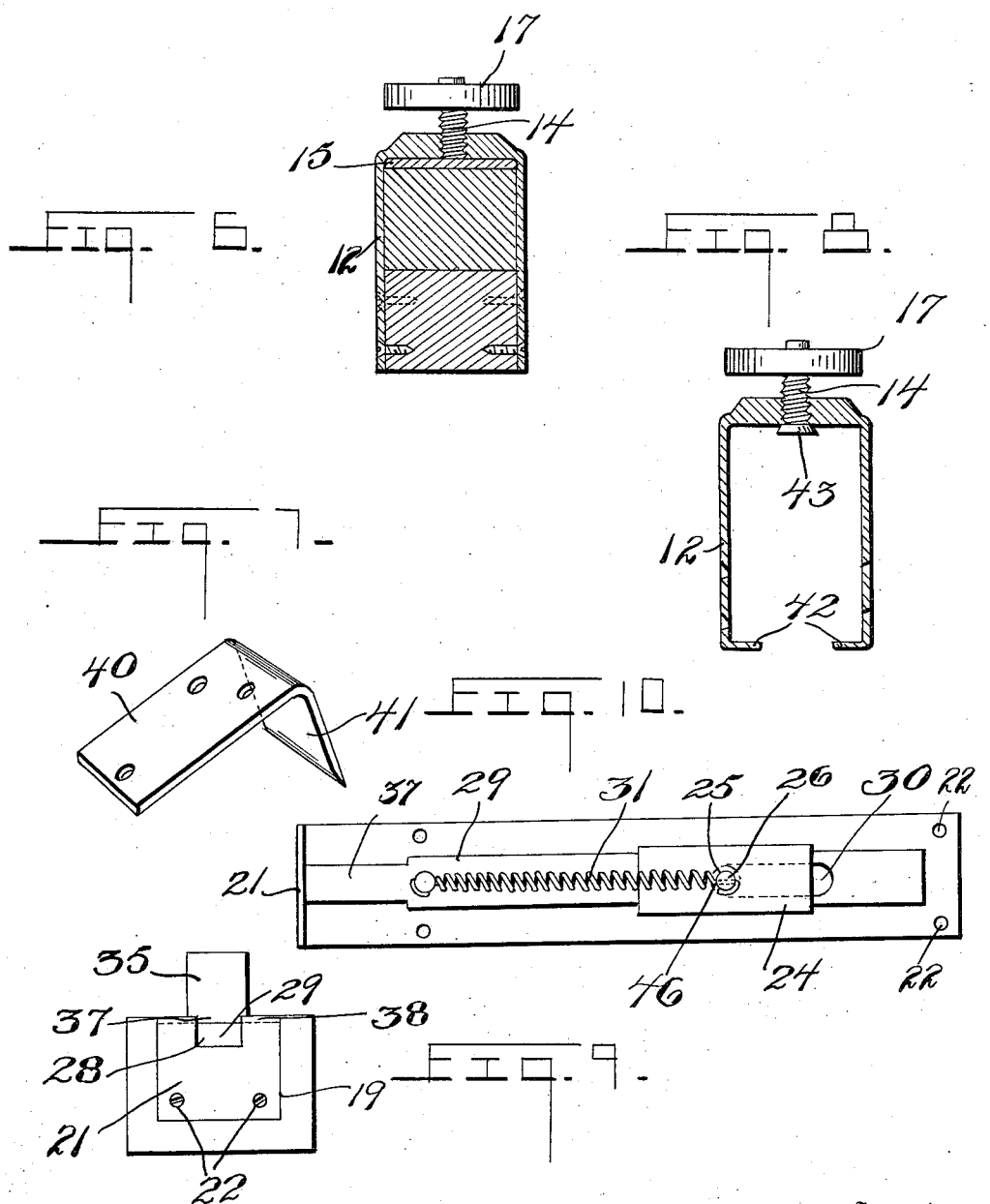

UNITED STATES PATENT OFFICE.

LEMUEL A. BOYCE, OF DRUMORE, PENNSYLVANIA.

GAGE.

1,031,517.  Specification of Letters Patent.  Patented July 2, 1912.

Application filed July 1, 1910. Serial No. 569,964.

*To all whom it may concern:*

Be it known that I, LEMUEL A. BOYCE, a citizen of the United States, residing at Drumore, in the county of Lancaster and State of Pennsylvania, have invented certain new and useful Improvements in Gages, of which the following is a specification.

This invention relates to gages and more especially to a device of this character adapted for the measurement of lumber.

An object of the invention is to provide an adjustable gage of this character, whereby the exact length of the lumber desired may be readily ascertained, so that the length of such lumber may be made to accord with the distance between two set points and for which the lumber is adapted for use.

A further object is to provide a simple device of this character which can be very cheaply manufactured and which can be very readily adjusted, to suit the particular occasion.

A still further and important object is to provide an adjustable block for one end of the gage which will permit the measurement of distances between any two set points, with the block disposed inwardly of the said end and with the block disposed outwardly with its inner face in abutment with the end, will permit said device to be placed upon the lumber and in this position the block will engage one end of the lumber and a suitable marker positioned at the opposite end of the gage may be used and the lumber accurately measured.

Other objects and advantages will be apparent from the following description, and it will be understood that changes in the specific structure shown and described may be made within the scope of the claims without departing from the spirit of the invention.

Referring to the drawings, Figure 1 is a side elevation of my device, showing its mode of use, in measuring the distance between two set points, Fig. 2 is a similar view, but showing its application to a piece of lumber for marking the same, Fig. 3 is a detail view of the block carrying member, in side elevation, removed from the gage strips, Fig. 4 is an under side view thereof, Fig. 5 is a detail view of the main bar or carrier for said block, Fig. 6 is a detail sectional view taken on the line 6—6 of Fig. 1, Fig. 7 is a detail view of the marker employed in connection with my invention, Fig. 8 is a detail sectional view of another form of adjusting member, Fig. 9 is an end view of the plate member used in connection with my improved attachment, Fig. 10 is an under side view of said plate detached from the gage strip.

Referring to the drawings in detail, I have shown my improved gage, which comprises the two strips 10 and 11, the inner ends of which have secured thereto, the straps 12 and 13 respectively, the strap 13 being secured to the end of the strip 11 and comprising an approximately U-shaped member having its opposite arms secured to said strip with a projecting portion forming a loop through which the strip 10 is adapted to slide. The strap 12 is similarly constructed except at the end portion thereof is provided with an attached or integral raised head through which a set screw 14 is adapted to operate.

The strip 11 is adapted for sliding movement within the loop portion of the strap 12 and in order to hold said strips in their adjusted positions I provide said strap with an engaging member 15, which has the outturned ends 16, to prevent a sharp engagement of the ends thereof with the lumber forming the strips. The engaging member 15 is journaled on the inner end of the set screw 14, so that rotation of the operating head 17 will move the engaging member inwardly to bind against the strip 11 and prevent independent movement of the two strips, but should the operating head be rotated in the opposite direction, the set screw and engaging member will be moved out of contact with the strip 11 and said strips can then be moved through the straps, whereby the gage may be adjusted to any desired length.

In order to provide for the measurement of the distance between two set points I provide one end of the strip 10 and one face thereof with a longitudinally extended groove 18, which extends a small portion of the length thereof and extends to the end of said strip, the portions of the strip to the rear and upon either side of the groove being rabbeted as shown at 19, such rabbeted portion being of less depth than the groove 18 and adapted to receive the angularly bent end of an L-shaped member 20, Fig. 3, so that when said plate is in position it will lie flush with the corresponding face of the strip in which it is set. This plate member has one end thereof bent or extended at right angles thereto, as shown at 21 and said portion is provided with suitable openings 22, through the medium of which the L-shaped member is secured to the strip 10 at one end and to the rabbeted faces 19. The strip 20 is further provided with an opening 23 disposed at a suitable distance from the inner end thereof and centrally of its width, an angular guide-sleeve 24 provided with a similar opening 25 being secured to the plate member by means of a rivet 26 which is headed upon the outer face of said plate and sleeve and extends through the sleeve so as to provide a central operating portion, for receiving the slot 30 of the bar 29 to limit the movement of the bar and to serve as a guide therefor. The sleeve 24 has the outturned sides 27 which may be provided as an additional means for rigidly securing said sleeve to the plate, as by means of rivets, screws or the like.

The outer end of the strip 20 is provided with a slot 28 Fig. 9 which is of the same width as the bar 29 and which extends through a portion of the angular end 21 and is adapted to receive said bar 29 for sliding movement therein. The bar 29 is provided with a slot 30 extending longitudinally of its length and disposed adjacent its inner end and permitting said bar a limited sliding movement over the operating portion of the rivet 26 and within the guide-sleeve 24, a coil spring 31 being secured to the rivet or sleeve and to the bar a short distance from its outer end, so as to hold said bar normally inwardly.

For purposes of convenience in manufacture, the bar 29 may be provided with a suitable hook 32 and the rivet member may be provided with a similar hook 33, by means of which the spring may be secured in position. Disposed upon the outer end of the bar 29 is a block 35 which has the engaging face 36 disposed at right angles to the face of the bar, said block being securely attached thereto and having a reduced portion 37 Fig. 9 forming suitable channels 38 in which the opposite longitudinal walls of the slot 28 are slidable, when the bar and block carried thereby are moved to either limit of its movement.

The block 35 is secured to the bar by means of screws or rivets 39 Fig. 4, disposed at spaced distances thereon, so that said block will be rigidly held against any lateral movement. As will also be noted, the reduced portion of the block is of the same width as the bar 29, so that sliding movement through the slot 28 will be permitted without any binding action and by reason of having the slot extended into the angular portion 21 to a greater depth than the thickness of the bar 29, the block may be moved outwardly of said angular portion and as said block is wider than the slot, it may be depressed with the bar into the slot in the angular portion and the engaging face thereof will abut said angular portion upon its outer face. With the block in this position, the length of the lumber desired may be accurately measured with the engaging face of the block disposed against one end of the lumber as shown in Fig. 2 of the drawings, the desired length having been previously ascertained with the block at the limit of its movement inwardly of the end of the strip 10 and the measurement taken from the opposite outer ends of the gage, as shown in Fig. 1 of the drawings.

In order to provide for the marking of the lumber, when the device is in use as shown in Fig. 2 of the drawings, the outer end of the strip 11 is provided with a rabbeted portion adapted to receive one arm of an angular marker 40 which is rigidly secured thereto and is provided with a right angular extended arm having a tempered edge 41, which may be forced into the lumber and a carpenter's square can then be put into use for determining the line upon which the lumber is to be cut.

In the modification of the device for securing the strips 10 and 11 for sliding movement relative to each other, the strap 12 has the inturned portions 42 which are adapted to engage one face of the strip 10, so as to prevent the strap from becoming loose upon said strip when the operating screw is forced inwardly. In this instance the operating screw is provided with an engaging head 43, as shown in Fig. 8 of the drawings, so as to prevent the withdrawal thereof and the engaging member 15 is movable independent of the screw but is actuated when in engagement therewith and the screw is rotated.

If desired I may simply extend the slot 28 into the angular portion of the plate a distance equal to the thickness of the bar 29, as shown in Fig. 9 of the drawings and may also dispose the block member inwardly of the end of the bar a distance equal to the thickness of the plate, so that said block will not interfere with the use of the device in ascertaining the distance between two set points as shown in Fig. 1 of the drawings. The end of the bar is reduced in width for a portion of its length, as shown at 44 so as to form engaging shoulders 45 which are adapted to limit the outward movement of the bar, with said shoulders in engagement with the angular portion 21 of the plate 20.

In the structure shown in Fig. 10 of the drawings the guide-sleeve 24 is formed without the extensions 27 but in this instance it is simply soldered or otherwise anchored to the plate and the inner end of the spring 31 is secured to the transverse opening 46 in the rivet 26, said rivet extending outwardly of the sleeve a short distance in order to permit such attachment. In this last form of my improved gage the block member and bar will always be returned to their innermost limit except when engaged with a piece of lumber and forced outwardly against the action of said spring.

It will therefore be obvious that I have provided a simple and easily operated gage for the purpose intended and one which may be adjusted to various lengths to suit the occasion, thereby permitting its use to various work.

The device can also be cheaply manufactured so that it will be available at a very reasonable price to all those desiring such tools.

It is of course understood that the block 35 is adjustable within the slot 28 of the plate 20 and angular portion 21 thereof, so that the said block may be moved to the position shown in Fig. 1 of the drawings for measuring the distance between two set points in which a section of lumber or other material is to be used and whereby it can be moved outwardly to the position shown in Fig. 2 of the drawings for engagement with the end of such material or lumber so that the same may be accurately marked for a similar length by the sharpened edge 41 of the marker 40.

What is claimed is:

1. A gage comprising a pair of strips mounted in telescopic relation, means for holding the strips in any desired position of adjustment relative to each other, a marker projecting from and secured to the outer end of one strip and a block carried by the outer end of the other strip, said block being slidably mounted on said last mentioned strip for movement outwardly and inwardly of the end of said strip.

2. A gage comprising a pair of strips mounted in telescopic relation, means carried by one strip for holding said strips to any desired relative position, an angular marker plate secured to the outer end of one strip, said plate having a knife edge adapted to be projected into the object to be measured, a bar slidably mounted upon the outer end of the opposite strip, a block carried by the end of the bar and means for holding the bar and block inwardly of the end of the strip.

3. A gage comprising a pair of strips, a strap secured to the inner end of one strip, said strap forming a loop through which the other strip is slidable, a second strap secured to the inner end of said last named strip, said first mentioned strip being slidable through a similar loop formed thereby, an adjusting screw carried by the second named strap whereby said strips may be held in their adjusted position, an angular plate secured to the outer end of one strip and projecting from one face thereof to form a suitable marker and a movable block carried by the outer end of the opposite strip and extending in the same direction as the marker plate.

4. A gage for the purpose set forth, comprising a pair of strips slidably and adjustably secured together, a marker carried by the outer end of one strip, a plate having an angular portion, said plate being secured upon one face and at the outer end of the other strip, said plate having a slot in its outer end and extending into the angular portion thereof, a bar slidably mounted on said plate and movable through the slot, a spring secured to the bar and anchored upon the plate to move said bar inwardly and a block projecting from and secured to the outer end of the bar, said block being limited in its movement in either direction.

5. A gage comprising a two-membered bar, said members being adjustably and slidably connected, a marker carried by one of said bars, a plate carried by the outer end of the opposite bar, said plate having a slot therein, a guide-way secured to said plate, a pin secured to the guide-way and plate, a bar slidable in the guide-way, said bar having a slot therein movable over the pin and adapted to limit the movement of the bar in either direction, a coil spring secured to the bar and the pin to hold said bar at the inner limit of its movement and a block secured to the outer end of the bar and projecting in the same direction as the marker, said block and bar being movable in the slot in the plate.

In testimony whereof I affix my signature, in presence of two witnesses.

LEMUEL A. BOYCE.

Witnesses:
 IRA F. WENTZ,
 DAVID WEIDLEY.